(12) United States Patent
Hung et al.

(10) Patent No.: US 8,987,656 B2
(45) Date of Patent: Mar. 24, 2015

(54) OPTICAL FINGER NAVIGATION DEVICE HAVING AN INTEGRATED AMBIENT LIGHT SENSOR AND ELECTRONIC SYSTEM COMPRISING THE SAME

(71) Applicant: SAE Magnetics (H.K.) Ltd., Hong Kong (HK)

(72) Inventors: Vincent Wai Hung, Hong Kong (HK); Victor Pak Hong Ng, Hong Kong (HK)

(73) Assignee: SAE Magnetics (H.K.) Ltd., Hong Kong (HK)

( * ) Notice: Subject to any disclaimer, the term of this patent is extended or adjusted under 35 U.S.C. 154(b) by 199 days.

(21) Appl. No.: 13/648,257

(22) Filed: Oct. 9, 2012

(65) Prior Publication Data

US 2014/0097327 A1   Apr. 10, 2014

(51) Int. Cl.
*H01J 40/14*     (2006.01)
*G06F 3/0354*    (2013.01)
*G01J 1/42*      (2006.01)
*G06F 3/042*     (2006.01)

(52) U.S. Cl.
CPC ........... *G06F 3/03547* (2013.01); *G01J 1/4204* (2013.01); *G01J 1/4228* (2013.01); *G06F 3/0425* (2013.01)
USPC .................................... 250/221; 250/214 AL (58) Field of Classification Search
CPC .............. G01C 21/00; G01J 1/04; G01J 1/42; G06M 7/00; G06F 3/042; G06F 3/0354; G06F 3/017; G06F 3/011
USPC ............... 250/221, 227.11, 227.14, 239, 216, 250/214 AL; 340/555–557, 602–604; 200/84 R
See application file for complete search history.

(56) References Cited

U.S. PATENT DOCUMENTS

| | | | |
|---|---|---|---|
| 7,230,260 B1 * | 6/2007 | Tarui .............................. | 250/574 |
| 7,902,988 B2 * | 3/2011 | Goto ............................. | 340/602 |
| 8,031,164 B2 | 10/2011 | Herz et al. | |
| 2008/0006762 A1 | 1/2008 | Fadell et al. | |
| 2012/0050189 A1 | 3/2012 | Choboter et al. | |

* cited by examiner

*Primary Examiner* — Que T Le (57) ABSTRACT

An optical finger navigation module includes a light source configured for emitting light in a first spectrum; a cover housing disposed above the light source, the cover housing including a window plate that is configured to transmit light in at least the first spectrum, and a light guiding structure that is configured to transmit light in at least a second spectrum; a first light sensor configured to sense light in the first spectrum originally emitted by the light source, reflected by an object, and then transmitted through the window plate; a second light sensor configured to sense light in the second spectrum transmitted through the light guiding structure or the window plate; and a substrate. The light source, the cover housing, the first light sensor and the second light sensor are coupled and mounted to the substrate.

20 Claims, 9 Drawing Sheets

FIG. 7B ation provides an electronic device that includes an optical finger navigation module configured for tracking the motion of an object. The optical finger navigation module includes: a light source configured for emitting light in a first spectrum; a cover housing disposed above the light source, the cover housing including a window plate that is configured to transmit light in at least the first spectrum, and a light guiding structure that is configured to transmit light in at least a second spectrum; a first light sensor disposed below the window plate and configured to sense light in the first spectrum originally emitted by the light source, reflected by the object, and then transmitted through the window plate; a second light sensor disposed below the window plate and configured to sense light in the second spectrum transmitted through the light guiding structure or the window plate; and a substrate. The light source, the cover housing, the first light sensor and the second light sensor are mounted to the substrate. The first spectrum is an infrared

OPTICAL FINGER NAVIGATION DEVICE HAVING AN INTEGRATED AMBIENT LIGHT SENSOR AND ELECTRONIC SYSTEM COMPRISING THE SAME

FIELD OF THE PATENT APPLICATION

The present patent application generally relates to consumer electronics and more specifically to a finger navigation module with an integrated ambient light sensor.

BACKGROUND

Many consumer electronics today include optical finger navigation (OFN) modules for a user to input through a GUI (Graphical User Interface). Many of these products also include an ambient light sensor module for sensing the ambient light. The ambient light intensity level detected by the ambient light sensor module is used to facilitate various functions such as the automatic adjustment of the screen brightness. However, as the optical finger navigation module and the ambient light sensor module are typically discrete components in such a product, the total component count of the product is relatively large. Because of this, the size and the weight of the product are also relatively large, and the cost of the product is relatively high.

SUMMARY

The present patent application is directed to an optical finger navigation module. In one aspect, the optical finger navigation module includes a light source configured for emitting light in a first spectrum; a cover housing disposed above the light source, the cover housing including a window plate that is configured to transmit light in at least the first spectrum, and a light guiding structure that is configured to transmit light in at least a second spectrum; a first light sensor configured to sense light in the first spectrum originally emitted by the light source, reflected by an object, and then transmitted through the window plate; a second light sensor configured to sense light in the second spectrum transmitted through the light guiding structure or the window plate; and a substrate. The light source, the cover housing, the first light sensor and the second light sensor are coupled and mounted to the substrate.

The first spectrum may be an infrared spectrum with a peak wavelength of about 850 nm. Light in the second spectrum may be visible light with a wavelength of 400 nm to 700 nm.

The optical finger navigation module may further include a first set of passive optical components being disposed between the light source and the window plate and configured to direct the light emitted by the light source to the object. The optical finger navigation module may further include a second set of passive optical components being disposed between the window plate and the first light sensor and configured to focus light reflected by the object to form an image onto the first light sensor. The window plate may be configured to selectively transmit light in the first spectrum and block light in the second spectrum. The first and second sets of passive optical components may include lenses and prisms.

The second light sensor may be coated with a coating or covered by a spectral filter that transmits light in the second spectrum while blocking light in the first spectrum. The light source may be a vertical-cavity surface-emitting laser or a light-emitting diode. The second light sensor may include an analog-to-digital converter configured to convert the light induced analog signal into a digital signal. The second light sensor may be a photo-transistor configured to output an analog signal to the first light sensor, and the first light sensor may be configured to convert the analog signal into a digital signal.

The optical finger navigation module may further include a data processing unit. The data processing unit may be electrically connected to the first light sensor, and configured to convert the subsequent change of a spatial intensity profile collected by the first light sensor into information regarding the motion of the object. The data processing unit may be configured to buffer the reading of the second light sensor for a predetermined period of time, to determine whether the object is being placed on the window plate, and when the object is determined to be being placed on the window plate to use the buffered reading of the second light sensor in place of the actual reading of the second light sensor.

The optical finger navigation module may further include a structure disposed between the light source and the first light sensor. The structure may define an aperture and be made of a material that blocks light, and part of the light reflected by the object may pass through the aperture before being projected onto the first light sensor.

The windows plate may be configured to transmit light in both the first spectrum and the second spectrum, and the first light sensor and the second light sensor may be two parts of an integrated sensor, covering a first sensing area and a second sensing area respectively. The optical finger navigation module may further include a first spectral filter disposed on top of the first light sensor and a second spectral filter disposed on top of the second light sensor. The first spectral filter may be configured to transmit light in the first spectrum and block light in the second spectrum, and the second spectral filter may be configured to transmit light in the second spectrum and block light in the first spectrum. The second spectral filter may include a plurality of sections with mutually different spectral responses, each section covering a subdivision of the second sensing area.

The optical finger navigation module may further include an additional light source and an optical guide. The second light source may include a plurality of LEDs being configured to emit light in the visible spectrum. The optical guide may be configured to couple light emitted by the additional light source to the light guiding structure. The light guiding structure may include light diffusive materials or be coated with light diffusive paint on the outer surfaces thereof. The optical finger navigation module may further include a switching control unit. The switching control unit may be configured to control the operation timing sequences between the light sources and the ambient light sensor in an alternating manner.

In another aspect, the present patent application provides an electronic device that includes an optical finger navigation module configured for tracking the motion of an object. The optical finger navigation module includes: a light source configured for emitting light in a first spectrum; a cover housing disposed above the light source, the cover housing including a window plate that is configured to transmit light in at least the first spectrum, and a light guiding structure that is configured to transmit light in at least a second spectrum; a first light sensor disposed below the window plate and configured to sense light in the first spectrum originally emitted by the light source, reflected by the object, and then transmitted through the window plate; a second light sensor disposed below the window plate and configured to sense light in the second spectrum transmitted through the light guiding structure or the window plate; and a substrate. The light source, the cover housing, the first light sensor and the second light sensor are mounted to the substrate. The first spectrum is an infrared spectrum with a peak wavelength of about 850 nm. Light in the second spectrum is visible light with a wavelength of 400 nm to 700 nm.

In yet another aspect, the present patent application provides an optical finger navigation module that includes: a light source configured for emitting light in a first spectrum; a cover housing disposed above the light source, the cover housing including a window plate and a light guiding structure; a first light sensor disposed below the window plate and configured to sense light in the first spectrum originally emitted by the light source, reflected by the object, and then transmitted through the window plate; a second light sensor disposed below the window plate and configured to sense light in a second spectrum transmitted through the light guiding structure or the window plate; a substrate; and a data processing unit. The light source, the cover housing, the first light sensor and the second light sensor are mounted to the substrate. The data processing unit is electrically connected to the first light sensor, and configured to convert the subsequent change of a spatial intensity profile collected by the first light sensor into information regarding the motion of the object.

DETAILED DESCRIPTION

Reference will now be made in detail to a preferred embodiment of the finger navigation module with an integrated ambient light sensor disclosed in the present patent application, examples of which are also provided in the following description. Exemplary embodiments of the finger navigation module disclosed in the present patent application are described in detail, although it will be apparent to those skilled in the relevant art that some features that are not particularly important to an understanding of the finger navigation module may not be shown for the sake of clarity.

Furthermore, it should be understood that the finger navigation module disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

Figure 1:
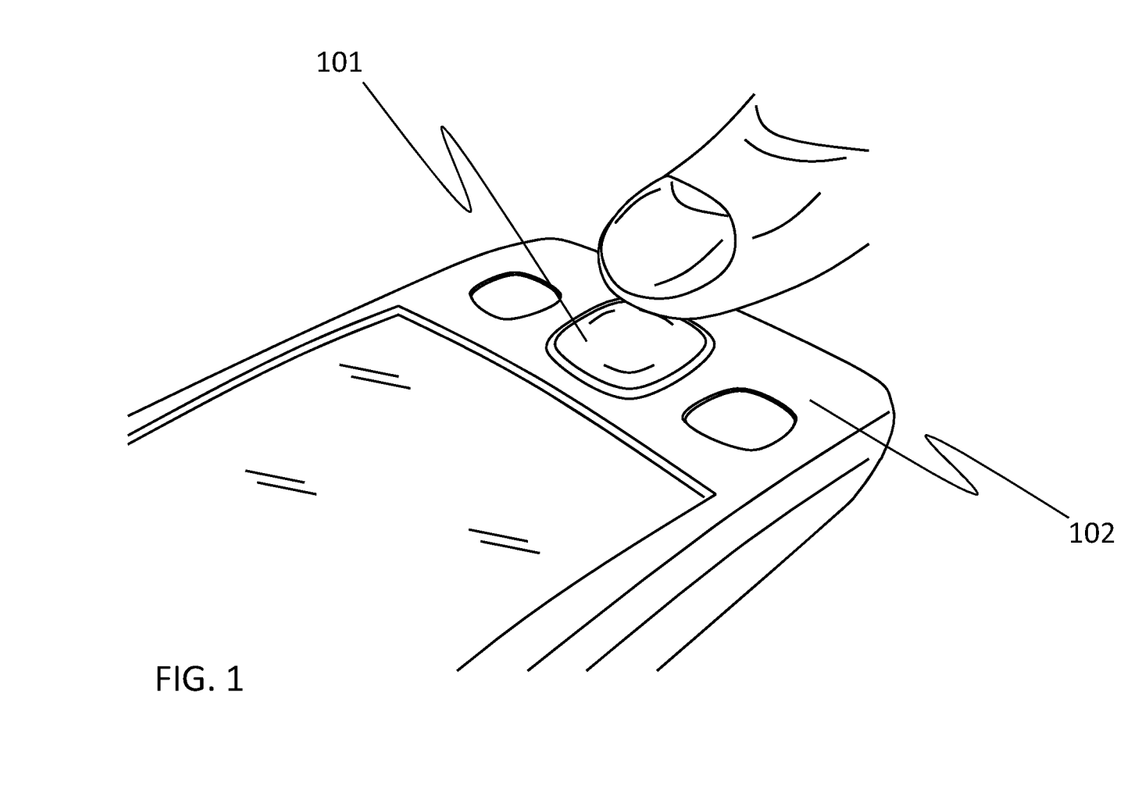
FIG. 1 illustrates an optical finger navigation module with an integrated ambient light sensor according to an embodiment of the present patent application implemented in a host device.

FIG. 1 illustrates an optical finger navigation module 101 with an integrated ambient light sensor according to an embodiment of the present patent application implemented in a host device 102. For example, the host device 102 can be a handheld mobile device.

Figure 2:
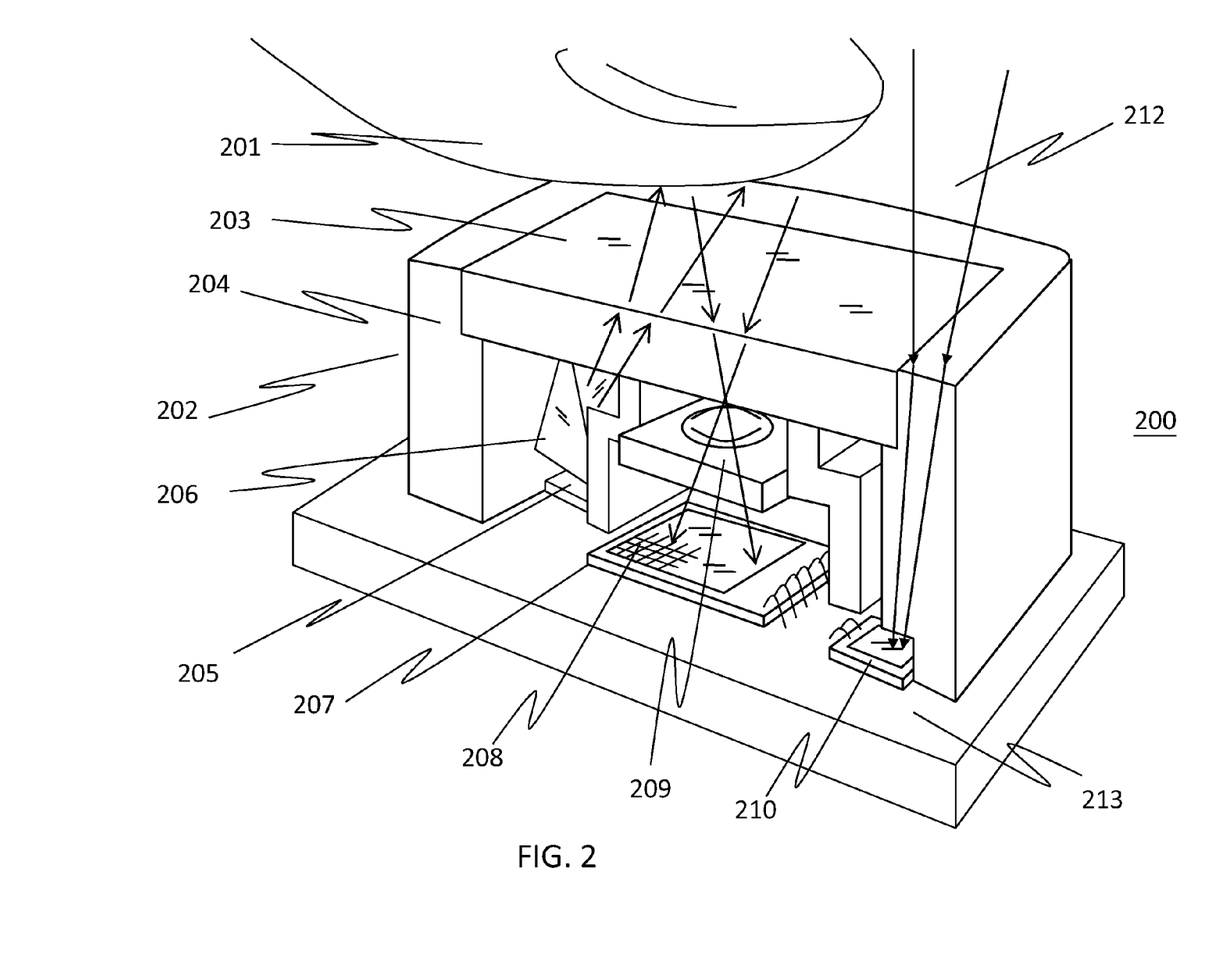
FIG. 2 illustrates a perspective view of a direct-image based optical finger navigation (OFN) module.

FIG. 2 illustrates a perspective view of a direct-image based optical finger navigation (OFN) module 200. The OFN module 200 is configured to detect the motion of an object 201, typically a finger of a user being located on the top of the OFN module 200. When the finger sweeps across the module surface, the OFN module 200 generates a signal according to the movement of the object 201 for the host device.

Referring to FIG. 2, the OFN module 200 includes a cover housing 202, a light source 205, a first set of passive optical components 206, a first light sensor 207, a second set of passive optical components 209, a data processing unit, and a second light sensor 210. The cover housing 202 includes a window plate 203 that selectively transmits a first spectrum of light, typically infrared light and particularly peaking around 850 nm wavelength, while blocking a second spectrum of light, typically the visible light, e.g. in 400 nm to 700 nm wavelength. The cover housing 202 further includes a light guiding structure 204. The light guiding structure 204 is configured to transmit at least the second spectrum of light. The light source 205 is configured to emit light in the first spectrum for illuminating the object 201. The first set of passive optical components 206, such as lenses, prisms, and etc., are configure to direct the light emitted by the light source 205 to illuminate the object 201 to be detected, which hovers above the window plate 203 of the cover housing 202. The first light sensor 207 with an array of pixels 208 is configured to respond to the first spectrum of light and collect the spatial light intensity profile formed thereon. The second set of passive optical components 209, such as lenses, prisms, and etc., are configured to collect the light in the first spectrum reflected by the object 201 and focus that light to form an image of the object onto the light sensor 207. The data processing unit is electrically connected to the light sensor 207. The data processing unit is configured to convert the subsequent change of the spatial intensity profile collected by the light sensor 207 into information regarding the motion of the object 201. The second light sensor 210 is an ambient light sensor and configured to respond to the ambient light 212 in the second spectrum that is projected onto the topmost surface of the light guiding structure 204 of the cover housing 202. Through the light guiding structure 204, the ambient light 212 is directed to the second light sensor 210. The second light sensor 210 may be coated with a coating or covered by a spectral filter that transmits the second spectrum of light while blocking the first spectrum of light. The light source 205 can be a VSCEL (vertical-cavity surface-emitting laser) or a LED (light-emitting diode). The light source 205, the cover housing 202, the first light sensor 207 and the ambient light sensor 210 are coupled and mounted to a PCB board 213 or a flex cable.

Figure 3:
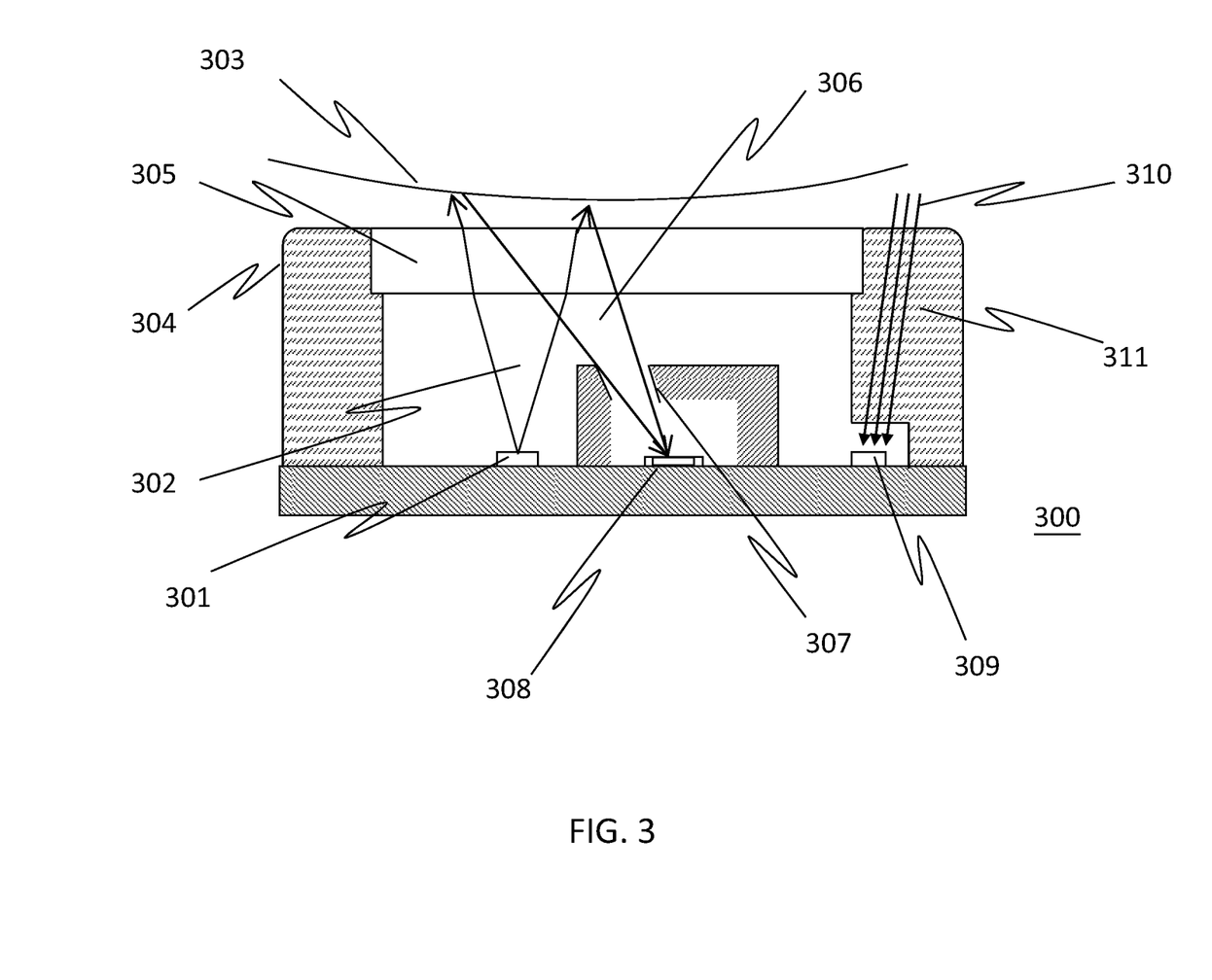
FIG. 3 illustrates a cross-sectional view of an optical finger navigation module according to another embodiment of the present patent application.

FIG. 3 illustrates a cross-sectional view of an optical finger navigation module according to another embodiment of the present patent application. Referring to FIG. 3, the OFN module 300 is a laser speckle type device. The light source 301 emits coherent light 302 in a first spectrum which illuminates the object 303 on top of the cover housing 304 through its window plate 305. The coherent light is reflected by the object 303 back through the window plate 305 of the cover housing 304, which transmits the first spectrum of light while blocking a second spectrum, typically visible light. Part of the light reflected 306 passes through an aperture 307 before being projected onto the first light sensor 308 and forms speckle patterns on thereon. The aperture 307 is defined by a structure made of a material that blocks light. The first light sensor 308 has an array of pixels that captures the spatial intensity profile of the speckle pattern formed on it. Moving the object 303 induces a corresponding movement of the speckle pattern which can be analyzed by a data processing unit connected to the first light sensor 308. The OFN module 300 also includes a second light sensor 309 as an ambient light sensor which receives ambient light 310 from the ambient directed by a light guiding structure 311 of the cover housing 304.

Figures 4A, 4B:
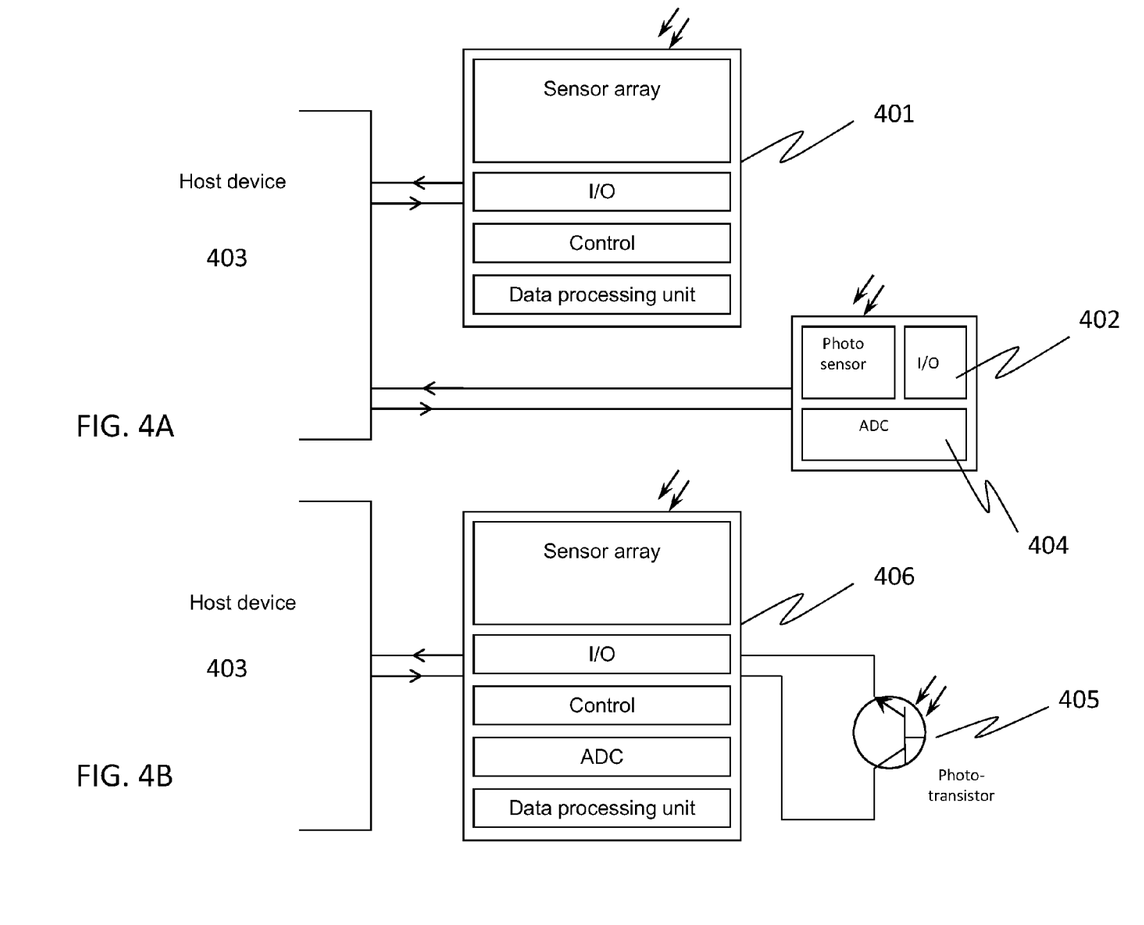
FIG. 4A is a schematic diagram illustrating an electrical connection scheme between the first light sensor for optical finger navigation, the second light sensor for ambient light sensing, and the host device according to one embodiment of the present patent application.
FIG. 4B is a schematic diagram illustrating an electrical connection scheme between the first light sensor for optical finger navigation, the second light sensor for ambient light sensing, and the host device according to another embodiment of the present patent application.

FIG. 4A and FIG. 4B are schematic diagrams of two possible electrical connection schemes between the first light sensor 401 for optical finger navigation, the second light sensor 402 for ambient light sensing, and the host device 403.

In one embodiment as depicted in FIG. 4A, the ambient light sensor 402 possesses itself the analog to digital conversion function by including an analog-to-digital converter (ADC) 404 configured to convert the light induced analog signal into a digital signal so that the output of it (the digital signal) is ready to be transmitted directly to the host device 403.

In another embodiment as depicted in FIG. 4B, the ambient light sensor is a photo-transistor 405, which outputs an analog signal in response to the ambient light level in the second spectrum. The light sensor 406 has input channels to receive this analog signal and is able to convert it into a digital signal and output the digital signal to the host device 403.

Figure 5A:
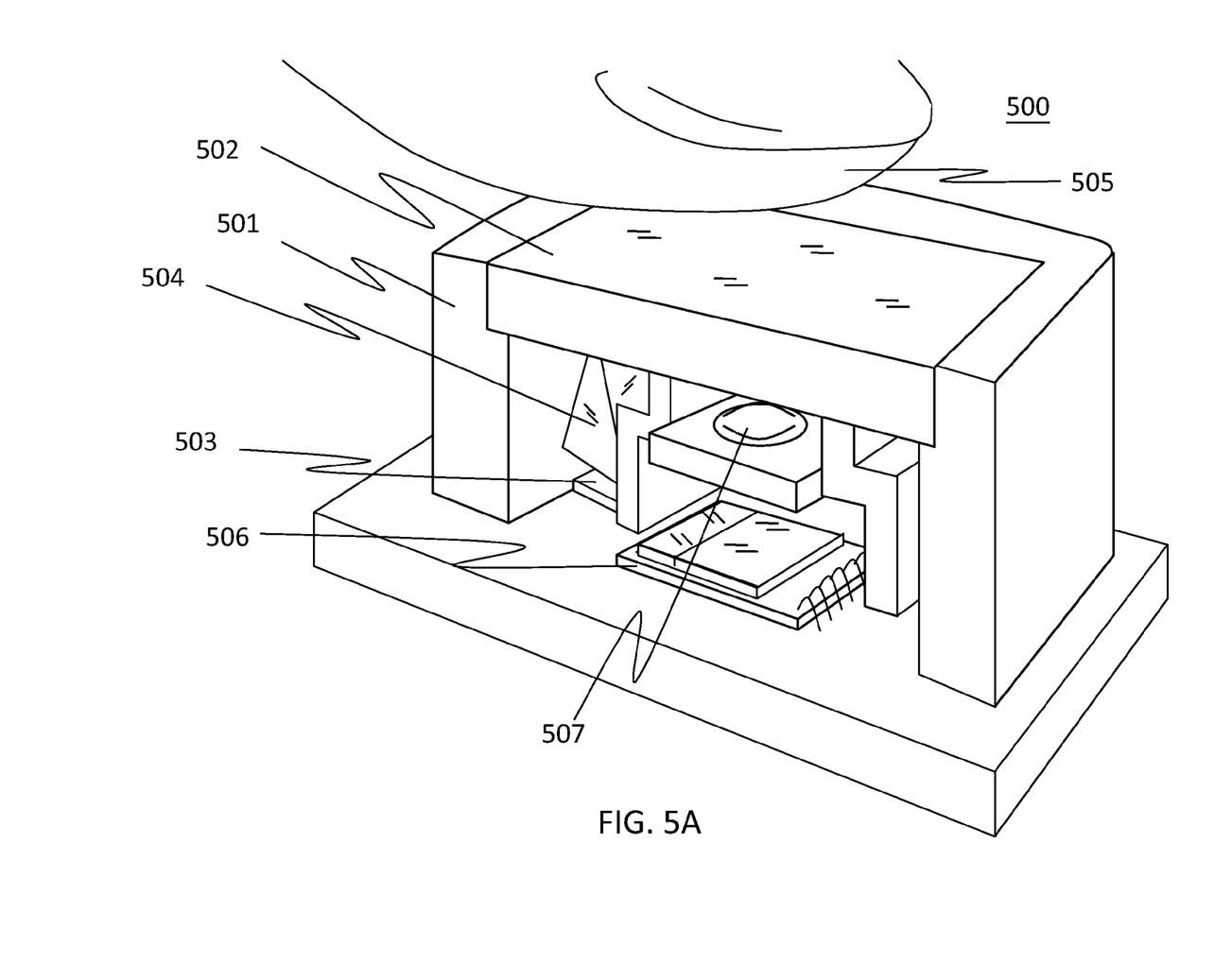
FIG. 5A illustrates a perspective view of an optical finger navigation (OFN) module according to another embodiment of the present patent application.

FIG. 5A illustrates a perspective view of an optical finger navigation (OFN) module according to another embodiment of the present patent application. Referring to FIG. 5A, the OFN module 500 includes a cover housing 501, a light source 503, a first set of passive optical components 504, a light sensor 506, a second set of passive optical components 507, and a data processing unit. The cover housing 501 includes a window plate 502 that transmits both a first spectrum and a second spectrum of light. The light source 503 is configured to emit light in the first spectrum. The first set of passive optical components 504, such as lenses, prisms, and etc., are configured to direct the light emitted by the light source 503 to illuminate object to be detected 505, which is placed and hovering above the window plate 502. The light sensor 506 with an array of pixels is configured to respond to the first spectral wavelength of light and collect the spatial light intensity profile formed on the sensing area thereof. The second set of passive optical components 507, such as lenses, prisms, and etc., are configured to collect the light in the first spectrum reflected by the object and focus that light to form an image of the object 505 onto the light sensor 506. The data processing unit is electrically connected to the light sensor 506, and configured to convert the subsequent change of the spatial intensity profile collected by the light sensor 506 into information regarding the motion of the object. It is noted that in this embodiment, the ambient light is transmitted through the window plate 502 before being sensed by the light sensor 506.

Figure 5B:
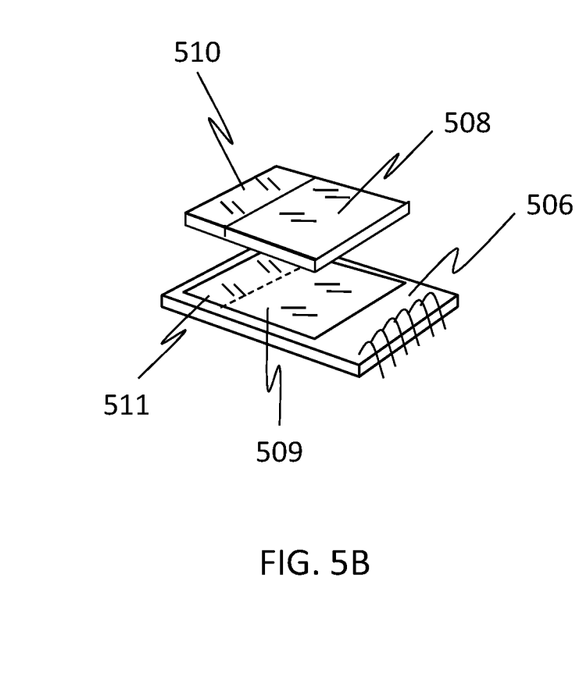
FIG. 5B illustrates the detailed structure of the light sensor in the OFN module depicted in FIG. 5A.

FIG. 5B illustrates the detailed structure of the light sensor 506 in the OFN module depicted in FIG. 5A. Referring to FIG. 5B, the light sensor 506 includes a first part of the sensing area 509 for finger navigation purpose, and a second part of the sensing area 511 for ambient light sensing purpose. A first spectral filter 508 that transmits the first spectrum of light while blocking the second spectrum of light is disposed on top of the light sensor 506 covering the first part of the sensing area 509. A second spectral filter 510 that transmits the second spectrum of light while blocking the first spectrum of light is disposed on top of the light sensor 506 covering the second part of the sensing area 511.

Figure 6:
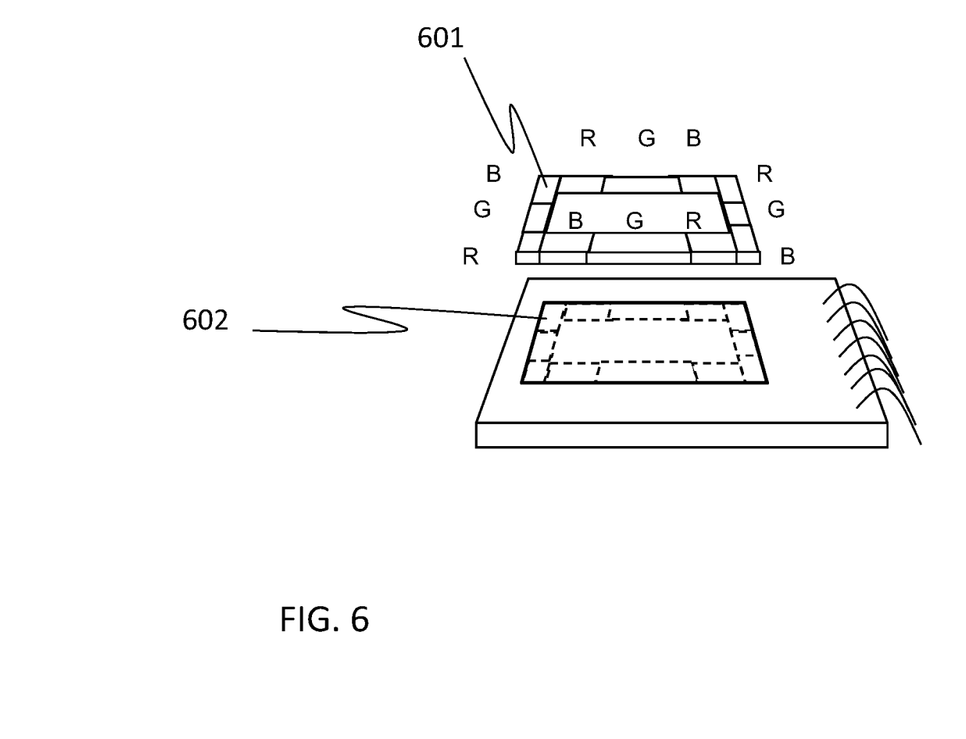
FIG. 6 illustrates the detailed structure of a light sensor used in an optical finger navigation module according to another embodiment of the present patent application.

FIG. 6 illustrates the detailed structure of a light sensor used in an optical finger navigation module according to another embodiment of the present patent application. In this embodiment, referring to FIG. 6, the second spectral filter (similar to the second spectral filter 510 in FIG. 5B) is subdivided into a plurality of sections 601 with mutually different spectral responses each covering a subdivision 602 of the second part of the sensing area so that they together in effect act as a color sensor. In particular, there can be three types of color filters 601 transmitting the primary color light of red, green and blue light respectively and the corresponding subdivisions 602 of the second sensing area can respectively provide relative luminous intensities of the three colors accordingly. The data processing unit may be configured to collect those relative luminous intensity data to provide the color information of the ambient light for the processor of the host device.

Figure 7A:
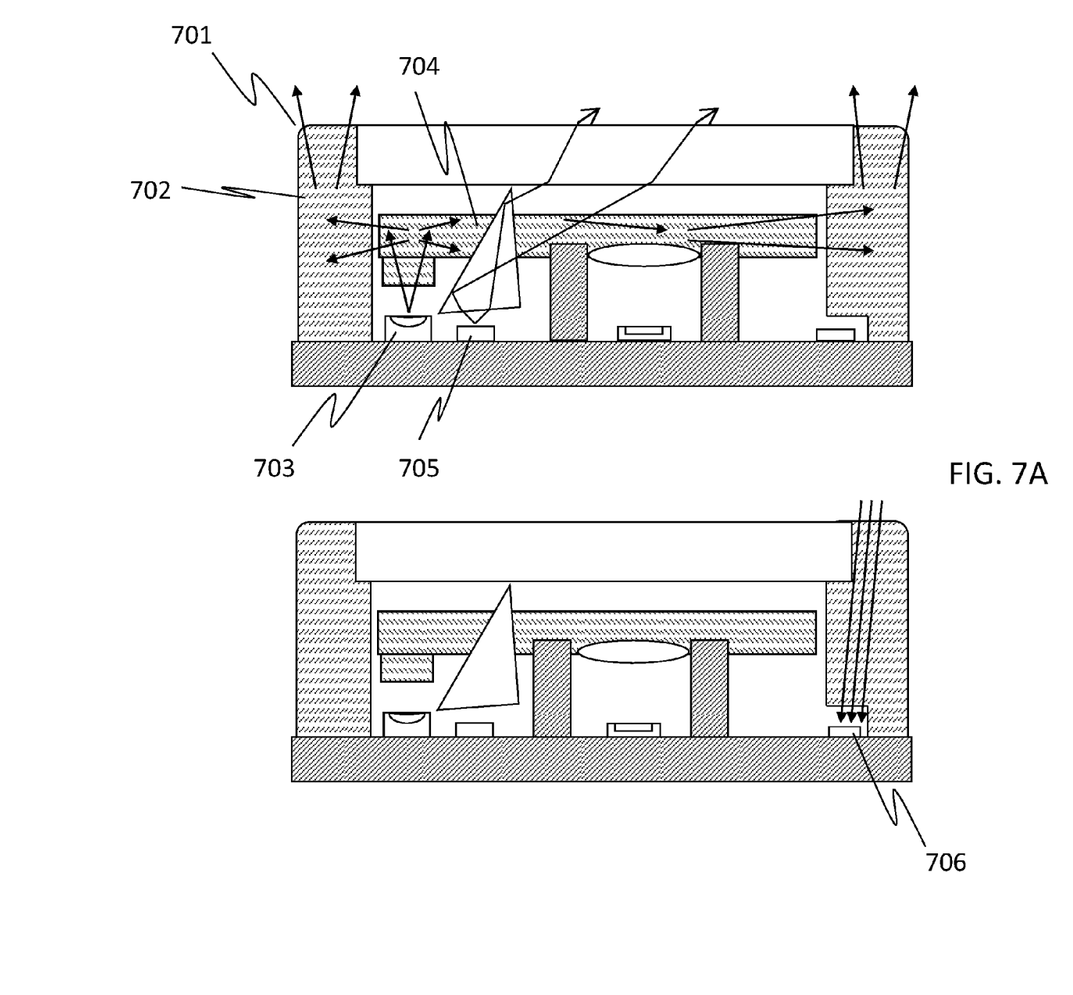
FIG. 7A illustrates a cross-sectional view of an optical finger navigation (OFN) module according to another embodiment of the present patent application.

FIG. 7A illustrates a cross-sectional view of an optical finger navigation (OFN) module according to another embodiment of the present patent application. Referring to FIG. 7A, the input surface 701 of the light guiding structure 702 of the cover housing for ambient light sensing also serves as a decorative illumination device. In this embodiment, the OFN module, which can be a direct-image type or of a laser speckle type, further includes a second light source 703 and an optical guide 704. The second light source 703, typically including a plurality of LEDs, is configured to emit light in the visible spectrum for illumination. The optical guide 704 is configured to couple the light emitted by the second light source 703 and direct it to the light guiding structure 702 of the cover housing. The light guiding structure 702 of the cover housing couples the light from the optical guide 704 and transmits it out to the ambient through the topmost surface 701. The light guiding structure 702 of the cover housing may include light diffusive materials such as titanium dioxide particles, and may be coated with light diffusive paint on its outer surfaces.

Figure 7B:
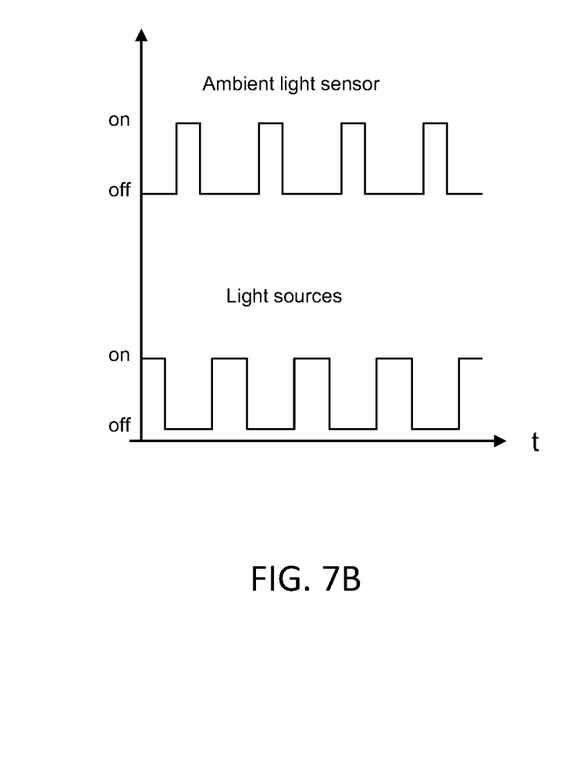
FIG. 7B is a timing diagram illustrating the operating timing sequences of the light sources and the ambient light sensor.

In this embodiment, the OFN module also includes a switching control unit to control the operation timing sequences between the light sources (the first light source 705 and the second light source 703) and the ambient light sensor 706 in an alternating manner as illustrated by the timing diagram in FIG. 7B. As a result, even if the illumination light from light sources 703 and 705 is coupled to the light guiding structure 702 and has reached the second light sensor 706 in a time frame, it will not be detected during that time frame as the second light sensor 706 is in the "off" state (not in operation) during the time frame.

When the object is approaching the OFN module, the OFN module would be covered by the object. The reading from the ambient light sensor will then no longer represent the actual ambient light intensity level. Therefore, in all the embodiments described above, either the host device or the data processing unit is configured to distinguish whether the OFN module is covered by an object or not, in other words, to distinguish whether an object is being placed on the window plate. This can be done by interpreting the data from the first light sensor in FIG. 2 or the first sensing area in FIG. 5B and by continuously keeping the reading of the ambient light sensor buffered for a certain (predetermined) period of time. When there is a clear signal showing that there is an object above the OFN module (the window plate), the reading given by the ambient light sensor can be ignored and the buffered reading is used to represent the ambient light intensity level instead.

The above embodiments provide the functions of optical finger navigation (OFN) and ambient light sensing integrated in a single physical module, which reduces the component count, size, weight and cost of the host device that utilizes the module. Possible uses of the embodiments include optical mouse, mobile phones, laptop computers, handheld devices, and any other consumer electronics products requiring user input through a GUI. The shape of the OFN module can be any desired shape from the outlook requirement, such as round, rectangular, and etc.

While the present patent application has been shown and described with particular references to a number of embodiments thereof, it should be noted that various other changes or modifications may be made without departing from the scope of the present invention.

What is claimed is:

1. An optical finger navigation device comprising:
    a light source configured for emitting detecting light in a first spectrum;
    a cover housing disposed above the light source, the cover housing comprising a window plate that is configured to transmit the detecting light in at least the first spectrum, and a light guiding structure that is configured to transmit ambient light in at least a second spectrum;
    a detecting light sensor configured to sense the detecting light in the first spectrum originally emitted by the light source, reflected by a finger, and then transmitted through the window plate;
    an ambient light sensor configured to sense the ambient light in the second spectrum transmitted through the light guiding structure or the window plate;
    a data processing unit; and
    a substrate; wherein:
    the light source, the cover housing, the detecting light sensor and the ambient light sensor are coupled and mounted to the substrate; and
    wherein the data processing unit is electrically connected to the detecting light sensor, and configured to convert a subsequent change of a spatial intensity profile collected by the detecting light sensor into information regarding a motion of the finger.

2. The optical finger navigation device of claim 1, wherein the first spectrum is an infrared spectrum with a peak wavelength of about 850 nm.

3. The optical finger navigation device of claim 1, wherein the ambient light in the second spectrum is visible light with a wavelength of 400 nm to 700 nm.

4. The optical finger navigation device of claim 1 further comprising a first set of passive optical components being disposed between the light source and the window plate and configured to direct the light emitted by the light source to the finger.

5. The optical finger navigation device of claim 4 further comprising a second set of passive optical components being disposed between the window plate and the detecting light sensor and configured to focus light reflected by the finger to form an image onto the detecting light sensor, wherein the window plate is configured to selectively transmit the detecting light in the first spectrum and block the ambient light in the second spectrum.

6. The optical finger navigation device of claim 5, wherein the first and second sets of passive optical components comprise lenses and prisms.

7. The optical finger navigation device of claim 1, wherein the ambient light sensor is coated with a coating or covered by a spectral filter that transmits the ambient light in the second spectrum while blocking the detecting light in the first spectrum.

8. The optical finger navigation device of claim 1, wherein the light source is a vertical-cavity surface-emitting laser or a light-emitting diode.

9. The optical finger navigation device of claim 1, wherein the ambient light sensor comprises an analog-to-digital converter configured to convert the light induced analog signal into a digital signal.

10. The optical finger navigation device of claim 1, wherein the ambient light sensor is a photo-transistor configured to output an analog signal to the detecting light sensor, and the detecting light sensor is configured to convert the analog signal into a digital signal.

11. The optical finger navigation device of claim 1, wherein the light guiding structure encloses a periphery of the window plate.

12. The optical finger navigation device of claim 1, wherein the data processing unit is configured to buffer a reading of the ambient light sensor for a predetermined period of time, to determine whether the finger is being placed on the window plate, and when the finger is determined to be being placed on the window plate to use the buffered reading of the ambient light sensor in place of an actual reading of the ambient light sensor.

13. The optical finger navigation device of claim 1 further comprising a structure disposed between the light source and the detecting light sensor, wherein the structure defines an aperture and is made of a material that blocks light, and part of the light reflected by the finger passes through the aperture before being projected onto the detecting light sensor.

14. The optical finger navigation device of claim 1, wherein the windows plate is configured to transmit the detecting light in the first spectrum and the ambient light in the second spectrum, and the detecting light sensor and the ambient light sensor are two parts of an integrated sensor, covering a first sensing area and a second sensing area respectively.

15. The optical finger navigation device of claim 14 further comprising a first spectral filter disposed on top of the detecting light sensor and a second spectral filter disposed on top of the ambient light sensor, wherein the first spectral filter is configured to transmit the detecting light in the first spectrum and block the ambient light in the second spectrum, and the second spectral filter is configured to transmit the ambient light in the second spectrum and block the detecting light in the first spectrum.

16. The optical finger navigation device of claim 15, wherein the second spectral filter comprises a plurality of sections with mutually different spectral responses, each section covering a subdivision of the second sensing area.

17. The optical finger navigation device of claim 1 further comprising a second light source and an optical guide, wherein the second light source comprises a plurality of LEDs being configured to emit light in a visible spectrum, the optical guide is configured to couple light emitted by the second light source to the light guiding structure, and the light guiding structure comprises light diffusive materials or is coated with light diffusive paint on the outer surfaces thereof.

18. The optical finger navigation device of claim 17 further comprising a switching control unit, wherein the switching control unit is configured to control an operation timing sequences between the light source and the ambient light sensor in an alternating manner.

19. An electronic system comprising an optical finger navigation device configured for tracking a motion of a finger, the optical finger navigation device comprising:
- a light source configured for emitting detecting light in a first spectrum;
- a cover housing disposed above the light source, the cover housing comprising a window plate that is configured to transmit the detecting light in at least the first spectrum, and a light guiding structure that is configured to transmit ambient light in at least a second spectrum;
- a detecting light sensor disposed below the window plate and configured to sense the detecting light in the first spectrum originally emitted by the light source, reflected by the finger, and then transmitted through the window plate;
- an ambient light sensor disposed below the window plate and configured to sense the ambient light in the second spectrum transmitted through the light guiding structure or the window plate; and
- a substrate; wherein:
- the light source, the cover housing, the detecting light sensor and the ambient light sensor are mounted to the substrate;
- the first spectrum is an infrared spectrum with a peak wavelength of about 850 nm; and
- the ambient light in the second spectrum is visible light with a wavelength of 400 nm to 700 nm.

20. An optical finger navigation device comprising:
- a light source configured for emitting detecting light in a first spectrum;
- a cover housing disposed above the light source, the cover housing comprising a window plate and a light guiding structure;
- a detecting light sensor disposed below the window plate and configured to sense the detecting light in the first spectrum originally emitted by the light source, reflected by a finger, and then transmitted through the window plate;
- an ambient light sensor disposed below the window plate and configured to sense the ambient light in a second spectrum transmitted through the light guiding structure or the window plate;
- a substrate; and
- a data processing unit; wherein:
- the light source, the cover housing, the detecting light sensor and the ambient light sensor are mounted to the substrate; and
- the data processing unit is electrically connected to the detecting light sensor, and configured to convert a subsequent change of a spatial intensity profile collected by the detecting light sensor into information regarding a motion of the finger.

* * * * *